(12) United States Patent
Ford

(10) Patent No.: US 6,823,645 B2
(45) Date of Patent: Nov. 30, 2004

(54) RADIAL TUBE AIR BAG FOLDING APPARATUS AND METHOD

(75) Inventor: Brian C. Ford, Mt. Clemens, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 74 days.

(21) Appl. No.: 09/938,011

(22) Filed: Aug. 23, 2001

(65) Prior Publication Data

US 2003/0038465 A1 Feb. 27, 2003

(51) Int. Cl.$^7$ .............................................. B65B 63/04
(52) U.S. Cl. ........................ 53/116; 53/120; 280/728.1; 280/743.1
(58) Field of Search ........................... 280/728.1, 743.1; 53/429, 116, 120; 493/405, 451, 458, 243, 244, 457

(56) References Cited

U.S. PATENT DOCUMENTS

| | | | |
|---|---|---|---|
| 4,936,815 A | * 6/1990 | Kirkland et al. ............ | 493/125 |
| 5,984,852 A | 11/1999 | Heudorfer et al. .......... | 493/457 |
| 6,171,228 B1 | 1/2001 | Marotzke et al. ........... | 493/405 |
| 6,248,052 B1 | * 6/2001 | Kleeberger et al. ......... | 493/374 |
| 6,305,150 B1 | 10/2001 | Dietsch ....................... | 53/529 |
| 6,327,838 B1 | 12/2001 | Maul et al. .................... | 53/429 |
| 6,371,512 B1 | * 4/2002 | Asano et al. ............. | 280/730.2 |
| 6,503,275 B1 | * 1/2003 | Cumming ................... | 623/6.12 |
| 6,532,716 B1 | * 3/2003 | Weis ............................ | 53/258 |

* cited by examiner

*Primary Examiner*—Eugene Kim
(74) *Attorney, Agent, or Firm*—Markell Seitzman

(57) ABSTRACT

A folding apparatus (100) for inserting an air bag and housing into an interior cavity of a cover, the apparatus comprising: an arcuately shaped tube, the tube sized in cross-section to slidably receive the housing and drawing the air bag up into the tube, the tube including an open first end oriented so that a plane through the first end is substantially parallel to vertical; a ram apparatus movable through the tube and adapted to hold and move the housing and air bag through the tube; a holding apparatus means for orienting the cover so that its internal cavity is in alignment with and adjacent to the first end such that the housing and air bag can be rammed into the cover internal cavity.

22 Claims, 11 Drawing Sheets

US 6,823,645 B2

RADIAL TUBE AIR BAG FOLDING APPARATUS AND METHOD

BACKGROUND AND SUMMARY OF THE INVENTION

The present invention generally relates to a machine and method of folding or compacting an air bag and more particularly a machine and method for compacting an air bag directly into its deployment cover.

A driver side air bag module often includes a cover, housing, air bag, retaining ring and inflator. The typical way of assembling an air bag module is to insert the retainer within the central opening of the air bag and then to mount the retainer and air bag to the housing. Thereafter, the air bag is precisely folded into the housing. Subsequently, the cover is attached to the housing. As a final step in the manufacturing process, the inflator is inserted and secured to the housing. The prior art has also proposed to fold an air bag in an arbitrary or chaotic manner and then take this folded air bag and insert it into an air bag housing in a conventional way.

The present invention proposes to fold an air bag also in an arbitrary or chaotic manner but to insert this folded air bag into the cover, and to use the module housing as part of the folding apparatus.

The present invention provides for a simple means of folding an air bag and does so in an ergonomic manner offering greater efficiencies. It is an object of the present invention to provide an apparatus for folding an air bag that is convenient to use.

Accordingly the invention comprises: a folding apparatus for inserting an air bag into an interior cavity of a cover. In the preferred embodiment the air bag is attached to a retaining ring and housing element before it is inserted into the cover. The apparatus comprises: an arcuately shaped tube, the tube sized in cross-section to slidably receive the housing. The tube includes an open first end oriented so that a plane through this first end is substantially parallel to vertical. While this orientation is preferred the open first end could be oriented in any desired direction. The folding apparatus includes a ram apparatus movable through the tube and adapted to hold and move the housing and air bag through the tube; when moved in one direction the ram apparatus moves the air bag and housing up the tube and when moved in the opposite direction the ram apparatus pushes the air bag and housing into the cover. The folding apparatus additionally includes holding means for orienting the cover so that its internal cavity is in alignment with and adjacent to the first end of the tube such that the housing and air bag can be rammed into the cover internal cavity.

Many other objects and purposes of the invention will be clear from the following detailed description of the drawings.

DETAILED DESCRIPTION OF THE DRAWINGS

Figure 1:
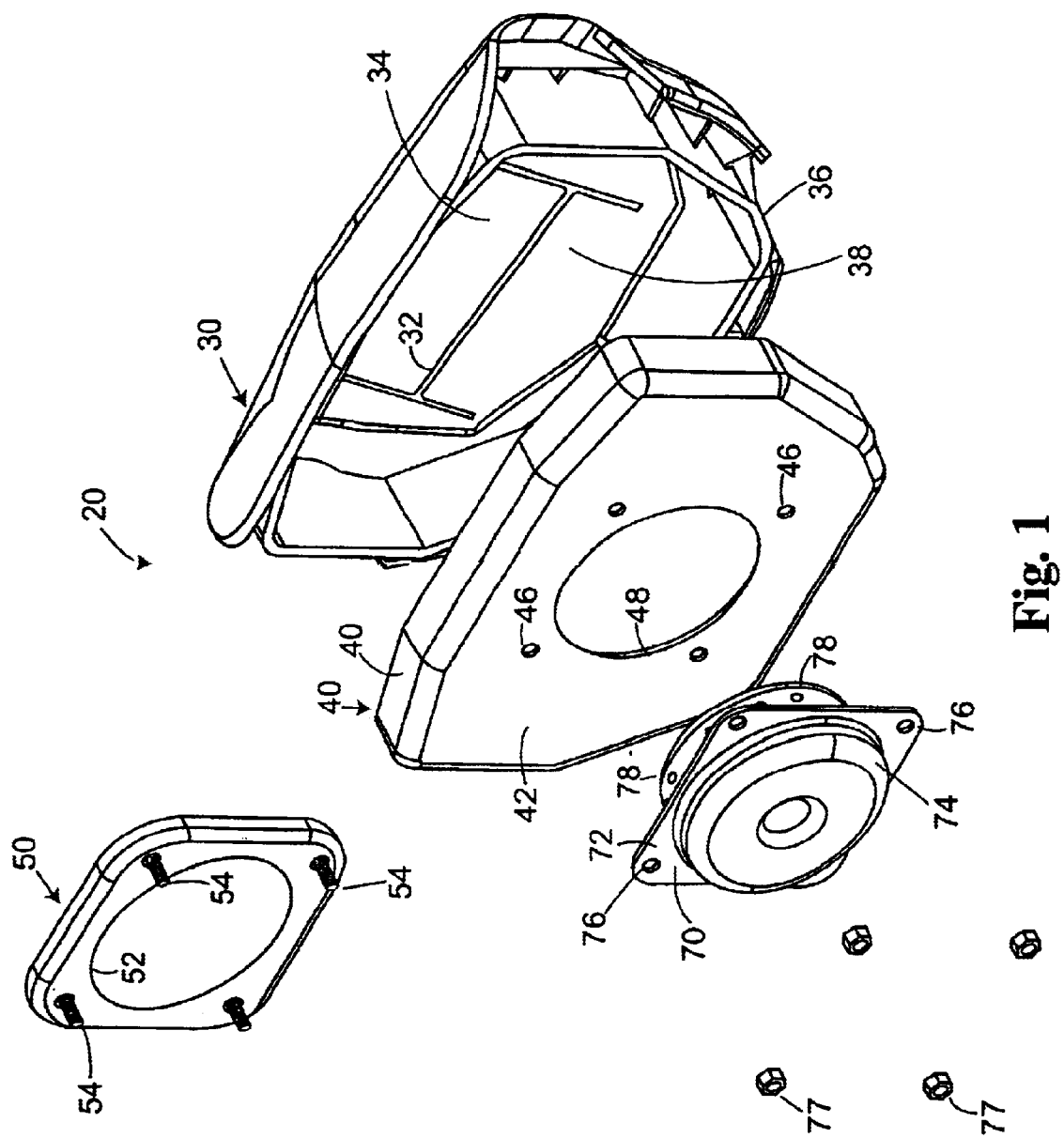
FIG. 1 is an exploded view of a typical driver side air bag module.
Figure 2:
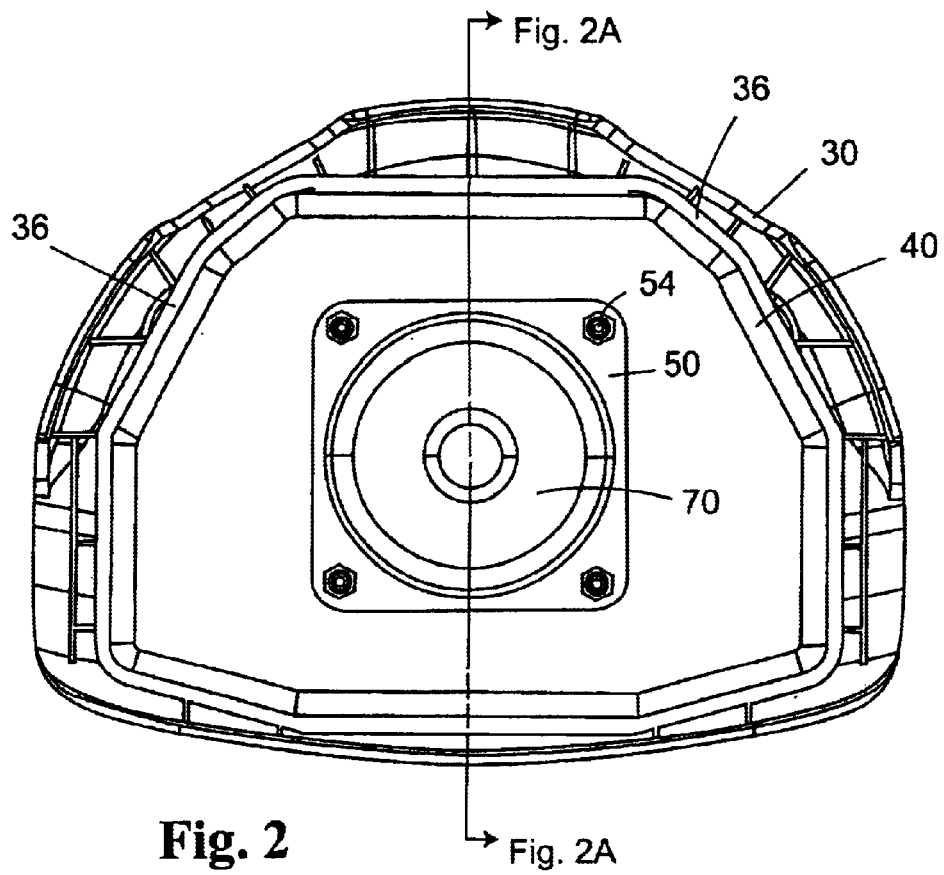
FIG. 2 is a rear plan view of an assembled module.
Figure 2A:
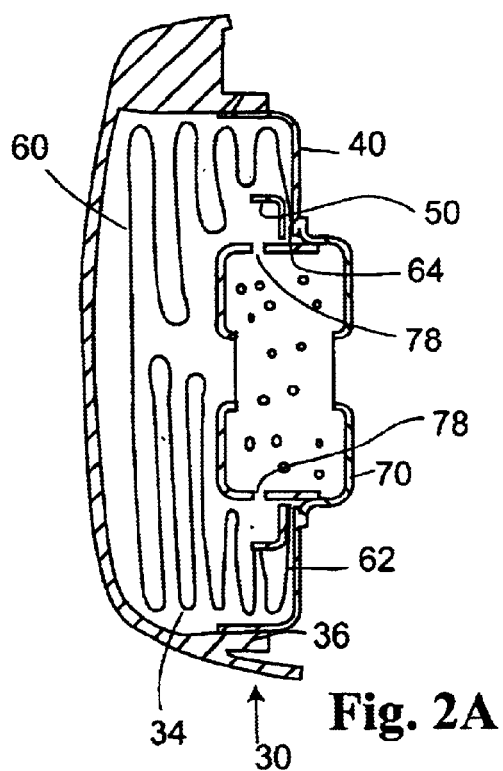
FIG. 2A is a cross-sectional view of an assembled driver side air bag module through section line 2A—2A of FIG. 2.
Figure 2B:
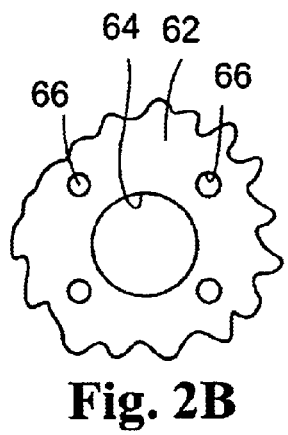
FIG. 2B is a diagrammatic view of a neck portion of an air bag.

Reference is briefly made to FIGS. 1–2 and 2A–B, which illustrate a typical driver side air bag module 20. The module comprises a deployment cover 30 having one or more tear seams generally shown as 32 (the tear seam can be visible or invisible when viewed from the outside of the cover), a housing 40, which is received within and secured to the underside of the cover. Many different cover arrangements can be used with the present invention. The housing comprises a bottom or plate 42 with a plurality of openings 46 and can include a continuous or segmented wall 44. If desired the wall 44 can be eliminated. The housing includes a central opening 48. The module additionally includes a retainer (ring) 50 having a central opening 52 and a plurality of mounting studs 54, which are received within a corresponding opening 46 of the housing 40. The module also comprises an air bag 60 having neck portion 62 with a central opening 64 and a plurality of openings 66. As can be seen in FIG. 2A, the neck portion 62 of the air bag is secured or clamped between the retainer 50 and the housing 40. The module further includes an inflator 70 comprising a mounting flange 72 with a plurality of openings 76. The inflator 70 includes a body 74 in which propellant and/or inflation gas is located and the body has a plurality of exit ports 78.

As previously indicated, a typical way of assembling an air bag module is to insert the retainer (retaining ring) within the central opening 64 of the air bag and then to carefully fold the air bag. Thereafter an optional fabric or paper covering (such as Tyvek) may be used to envelop the folded cushion to maintain the fold during the subsequent handling of the folded bag. Thereafter, the folded air bag is inserted into the housing. Subsequently, the cover is attached to the housing. Thereafter, the inflator is inserted and secured to the housing.

Figure 3:
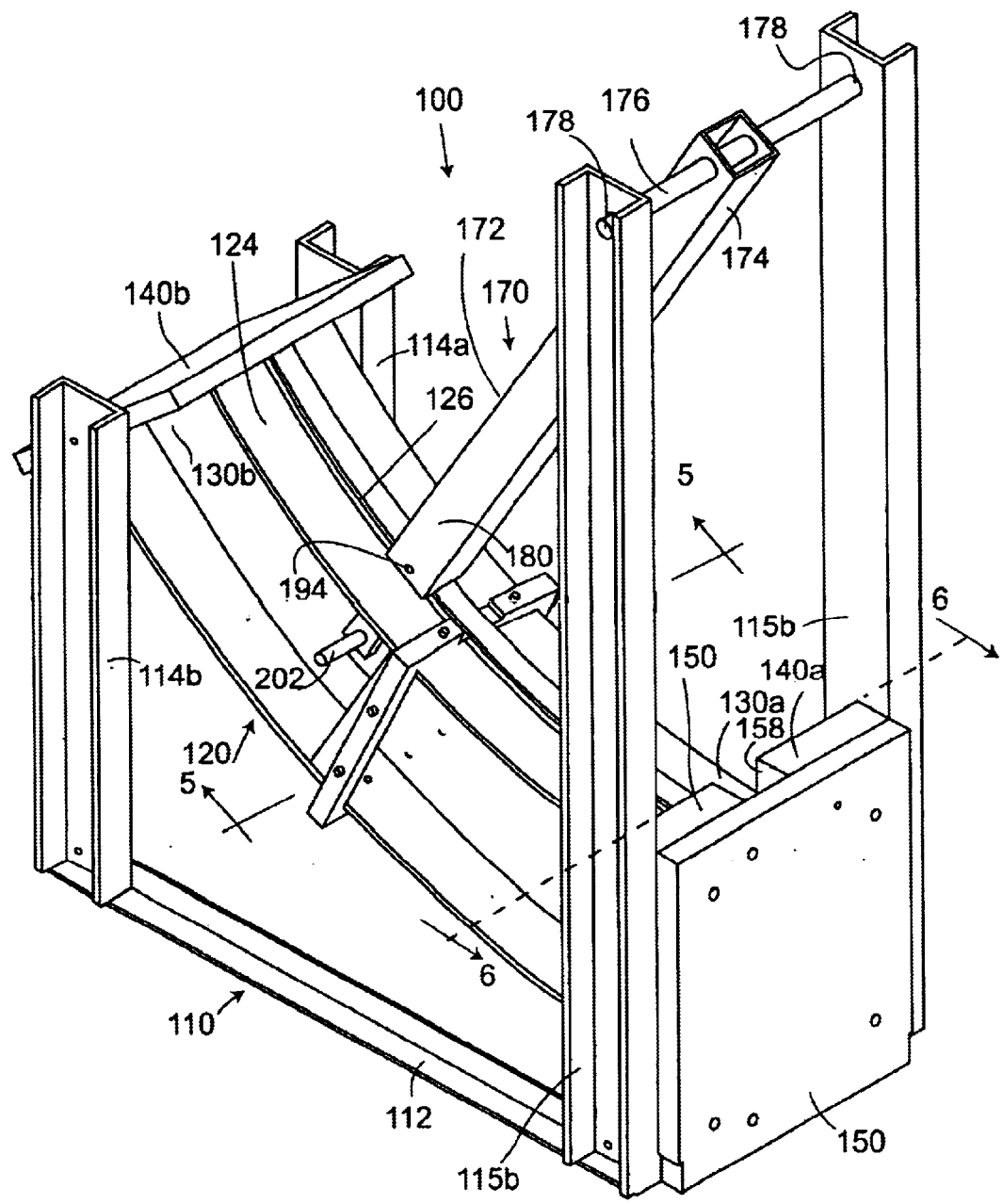
FIG. 3 is an isometric view showing the major components of a folding apparatus.

Reference is made to FIG. 3, which illustrates a folding apparatus 100, which is designed to compact (or otherwise fold) and insert an air bag such as 60, as well as the air bag housing 40, directly within an interior cavity 34 or underside of a cover such as 30. This cavity 34 will typically be formed from one or more walls 36 (see FIGS. 1 and 2A) which extend from the undersurface 38 of the top or exposed surface of the cover. The walls may include ramps or wedges, which interlock with portions of the housing 40 to provide a snap-fit therebetween. As is well known, the walls 36 can also be riveted to the walls 44 of the housing 40. The shape of the housing and hence the shape of the tube 120 is not important other than the exterior shape of the air bag housing 40 and the interior profile of the tube 120 of the folding apparatus will be closely similar.

The folding apparatus 100 comprises an arcuately-shaped tube 120 supported on a frame 110. The frame has a base 112, a first set of vertical or forward supports 114a and 114b and a second set of vertical or rear supports 115a and 115b. The tube is preferably made of an extruded Lexan, which will enable most of the folding process to be observable by the operator. The tube 120 can be manufactured using a number of suitable materials and can be formed of a single piece or of multiple pieces. In the preferred embodiment the tube 120 is extruded.

Figure 4:
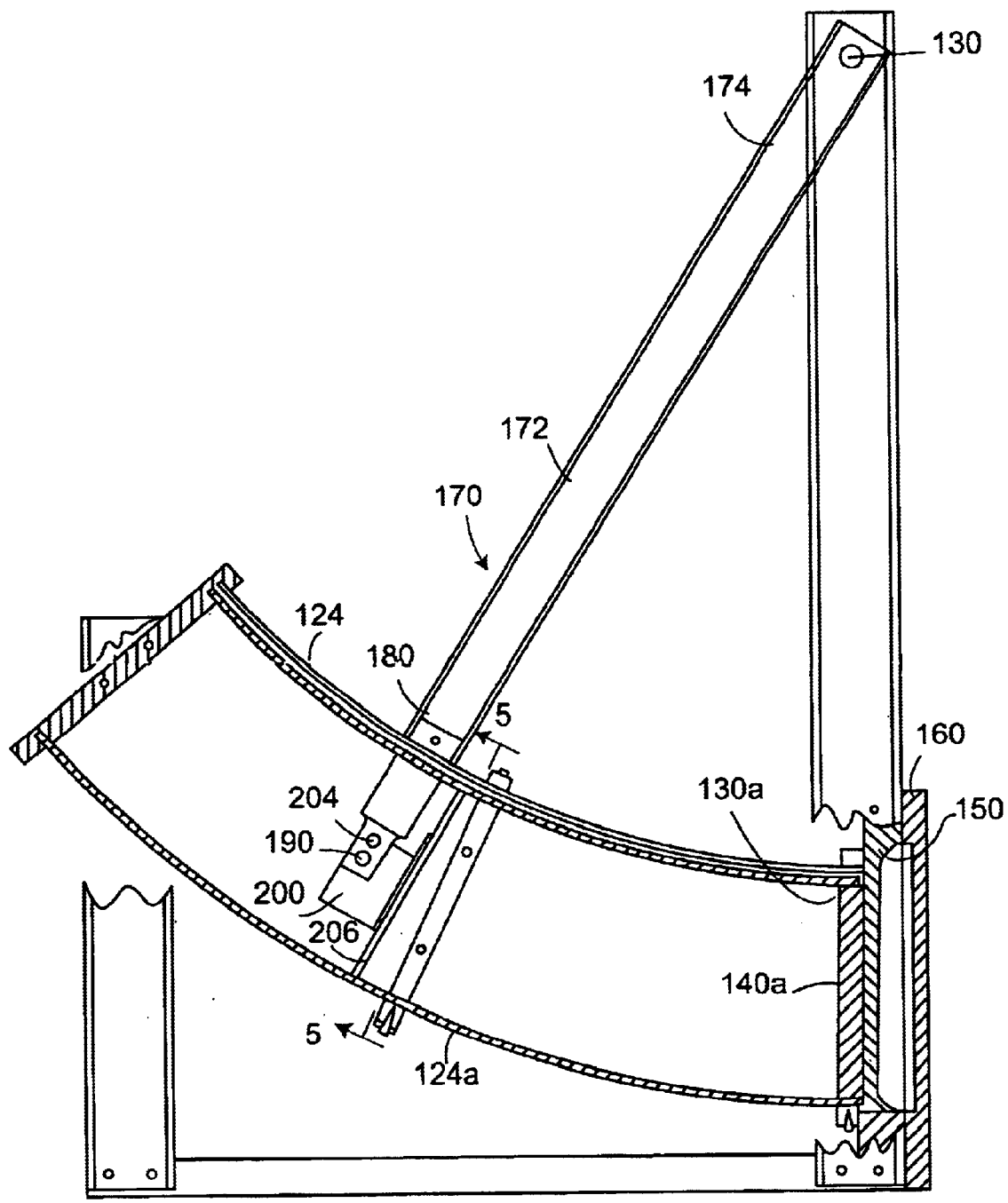
FIG. 4 is a cross-sectional view of the folding apparatus.
Figure 5:
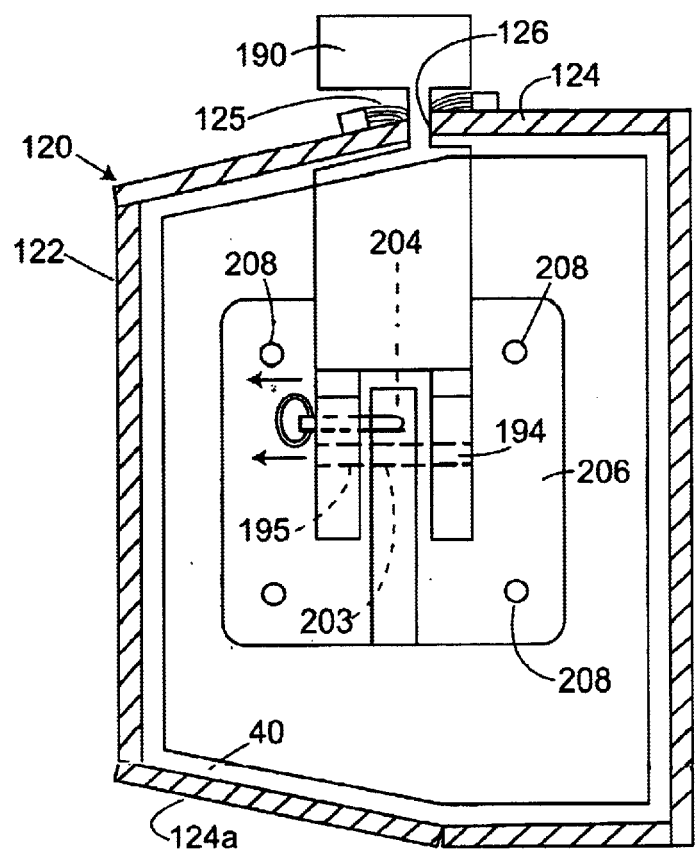
FIG. 5 is a cross-sectional view through section 5—5 of either FIG. 3 or FIG. 4.

Reference is briefly made to FIG. 5, which shows a cross-sectional view through the tube 120. As can be seen, the configuration of the various walls 122 forming the tube 120 is similar in shape and size to the exterior profile of housing 40. A top wall such as 124 is split to define a channel 126, which runs the length of wall 124. As can be appreciated from the configuration shown in FIG. 4, wall 124 is radial in shape, having a dimension R1 as measured from a pivot point 130 while its opposite wall 124a is also radial in shape, though having a somewhat larger radius. The walls 124 and 124a share a common center. As will be discussed below, channel 126 can be covered or can be obscured by optional deformable weather stripping or a two-sided conveyer brush 125 (see FIG. 5) to prevent the air bag 60 from exiting the tube 120 during the folding process and to prevent dirt and dust from entering therein. As can be appreciated the width of the channel 126 can be made only slightly wider than that portion of the folding apparatus that is inserted therein, which would eliminate the need for the weather stripping or brush(es).

Figure 6:
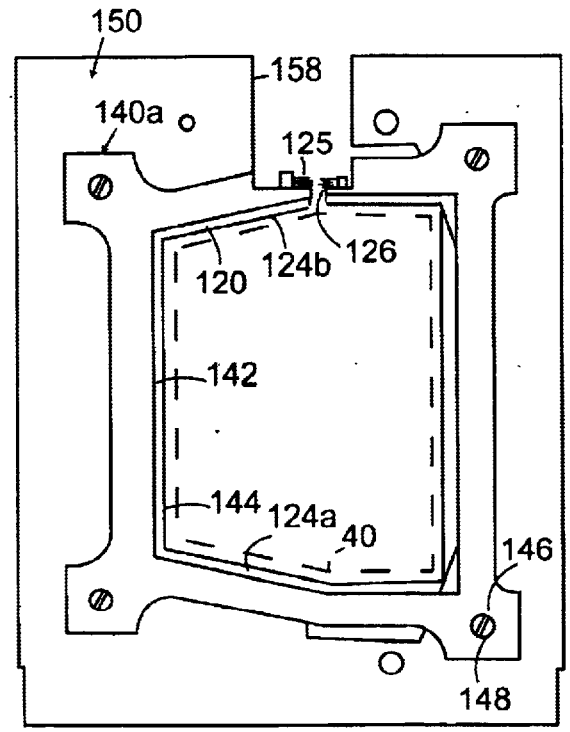
FIG. 6 is a plan view looking at the front of the forward support member.

With reference to FIGS. 3 and 4, it can be seen that the forward end 130a and the rear end 130b of the tube are connected to forward tube and rear tube support members 140a and 140b. As can be seen in FIG. 3, rear tube support member 140b is closed to prevent debris from entering the folding machine, however, it can be open. The forward tube support member 140a is annular (picture frame-like) in construction (also shown in FIG. 6) having a plurality of walls 142 to receive the open mouth 144, which is located at tube end 130a. The forward tube support member 140a includes a plurality of tabs 146, each tab includes a fastener opening 148 to permit the forward tube support member 140a to be secured (see fasteners 148a) to a rear cover support member 150. As can be appreciated, the forward tube support member 140a and the rear cover support member 150 can be integrated into one member. The profile of the tube 120 is visible in FIG. 4 (as well as FIG. 6). The closely spaced housing 40 is also shown in phantom line in FIG. 6 with tube 120.

Figure 7:
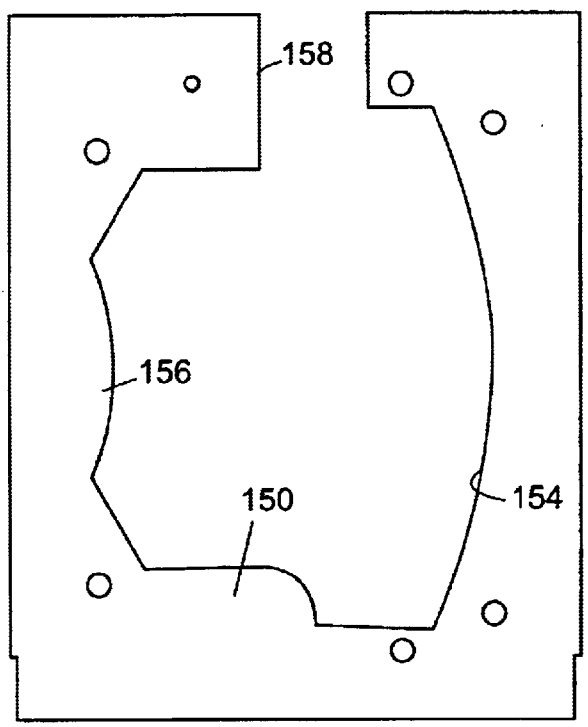
FIG. 7 is a plan view of the front of the rear cover support member.

As can be seen in FIGS. 1 and 7, the rear cover support member 150 comprises a generally rectangular body that butts against tube support member 140a. Member 152 has a center opening 154 coinciding with the opening or mouth 144 of the tube 120 (also see FIG. 6). To prevent any spacing between the forward face of the tube support 140a and the rear cover support member 150, it might be desirable to configure the tube 120 so that it extends slightly in front of the forward tube support member 140a. As shown, the end or mouth of tube 120 is in alignment with a forward or outer face of the support member 140a. Member 150 includes a shaped opening 154, which is shaped to receive the lower face of the cover 30. As will be seen, the cover 30 is positioned within opening 154 during the folding process with the cavity 34 of the cover adjacent the opening end of the tube 120. As can be seen, the contour of opening 154 follows the shape of the cover 30.

Positioned in front of a rear cover support member 150 is an outer or front cover support member 160. This support member 160 is removably mounted relative to cover support member 150 and the tube 120. More particularly, the front or outer cover support member 160 may be hinged relative to the vertical support 114b (which supports tube 120) or to the rear support member 150 so that the front cover support member 160 can be moved away from the support member 150 to provide access to the front of member 150 so that the cover can be loaded into the rear cover support member 150.

Figure 8:
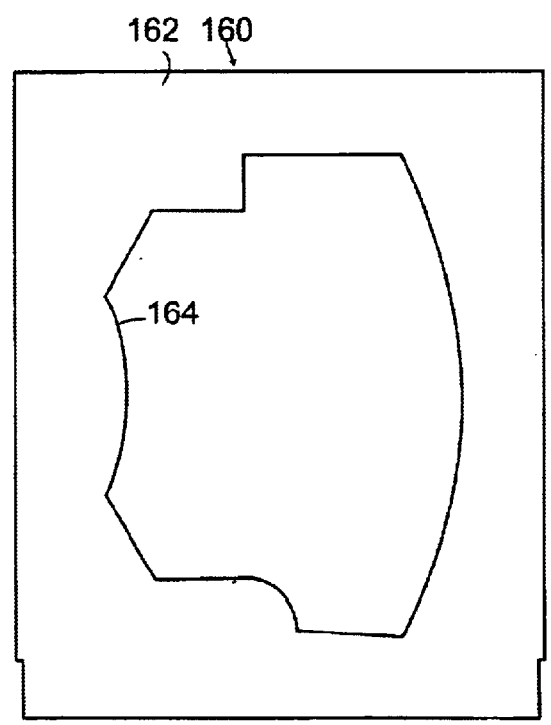
FIG. 8 is a plan view of a rear, mating side of a front cover support member.

Reference is made to FIG. 8, which shows a plan view of a rear mating surface 162 of the forward support member 160. When in position, the surface 162 abuts the member 150. The surface 162 includes a recessed contour 164 in the shape of the exterior contour of the cover 30. As will be seen from the description below, the cover 30 is positioned within the contour 156 (of the rear cover support member 150) and with the member 160 moved to its closed position, the cover is sandwiched between and held in place by the cover support members 150 and 160.

Figure 9:
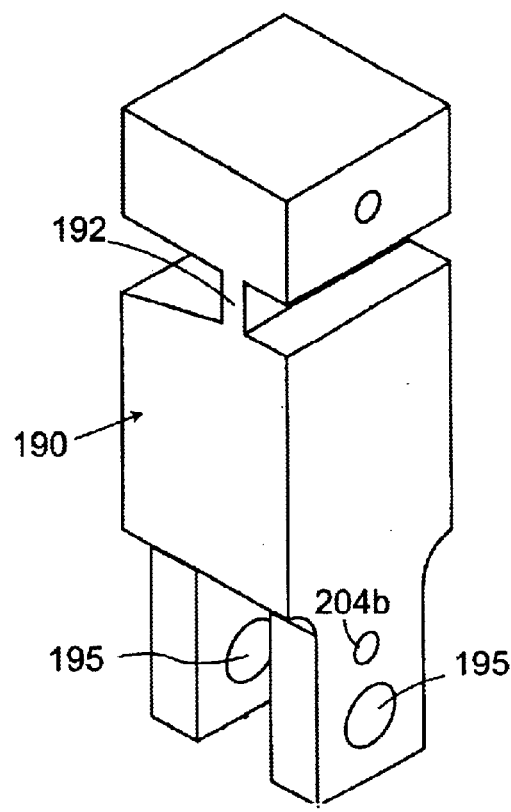
FIG. 9 is an isometric view of a housing attachment member.
Figure 10:
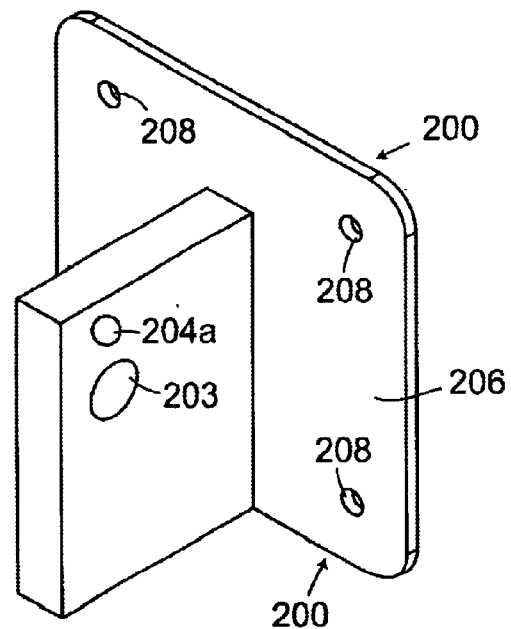
FIG. 10 is an isometric view showing a plate of a housing support member

Reference is again made to FIGS. 3, 4, 5 and 7. As can be seen, the folding apparatus 100 includes a rotatable ram arm assembly 170. The assembly 170 includes an arm 172, which is pivoted at end 174 at the pivot point 130. More specifically, a bar 176 extends through arm 172 and is rotationally supported at openings 178 in each of the vertical support members 114a and 114b. Other pivot arrangements are possible. The lower end 180 of arm 172 is connected to an arm attachment member 190. The attachment member 190 is further seen in FIGS. 5, 8 and 9. The attachment member 190 includes a thin bar 192 that extends through the slot 126 and is secured to the arm 172 by a pin 194, which is received through a corresponding opening in 190 (see FIG. 3). The other end of the support member 190 is pivoted to a housing support 200. As will be shown below, the housing support 200 is rotatable about a pin pivot 202 (received in openings 203 in 200 and 195 in 190) but lockable in a preferred orientation by a manually operable pin 204 that extends through opening 204a in the support 200 and opening 204b in the attachment member 190. The pin 204 may include a grab ring 204d (only shown in FIG. 5). The support member 200 includes a mounting plate 205 to which the housing 40 is fastened. As can be seen in FIG. 10, the plate 206 includes a plurality of mounting holes 208 to receive the retainer ring fasteners 54 to permit the housing, and more particularly a housing sub-assembly 220, comprising the housing 40, the retaining ring 50 and air bag 60 to be mounted upon plate 206. Once the fasteners are received through openings 208 the sub-assembly 220 is secured to the plate 206.

Reference is again made to FIGS. 3 and 7. As can be seen, the rear cover support member 150 additionally includes a notch 158 positioned in line with a channel 126. This construction permits the ram arm assembly 170 to be rotated completely out of the tube 120 so that the operator has convenient access to mount the housing 40 to the housing support 200 at the beginning of the folding process.

Figure 11:
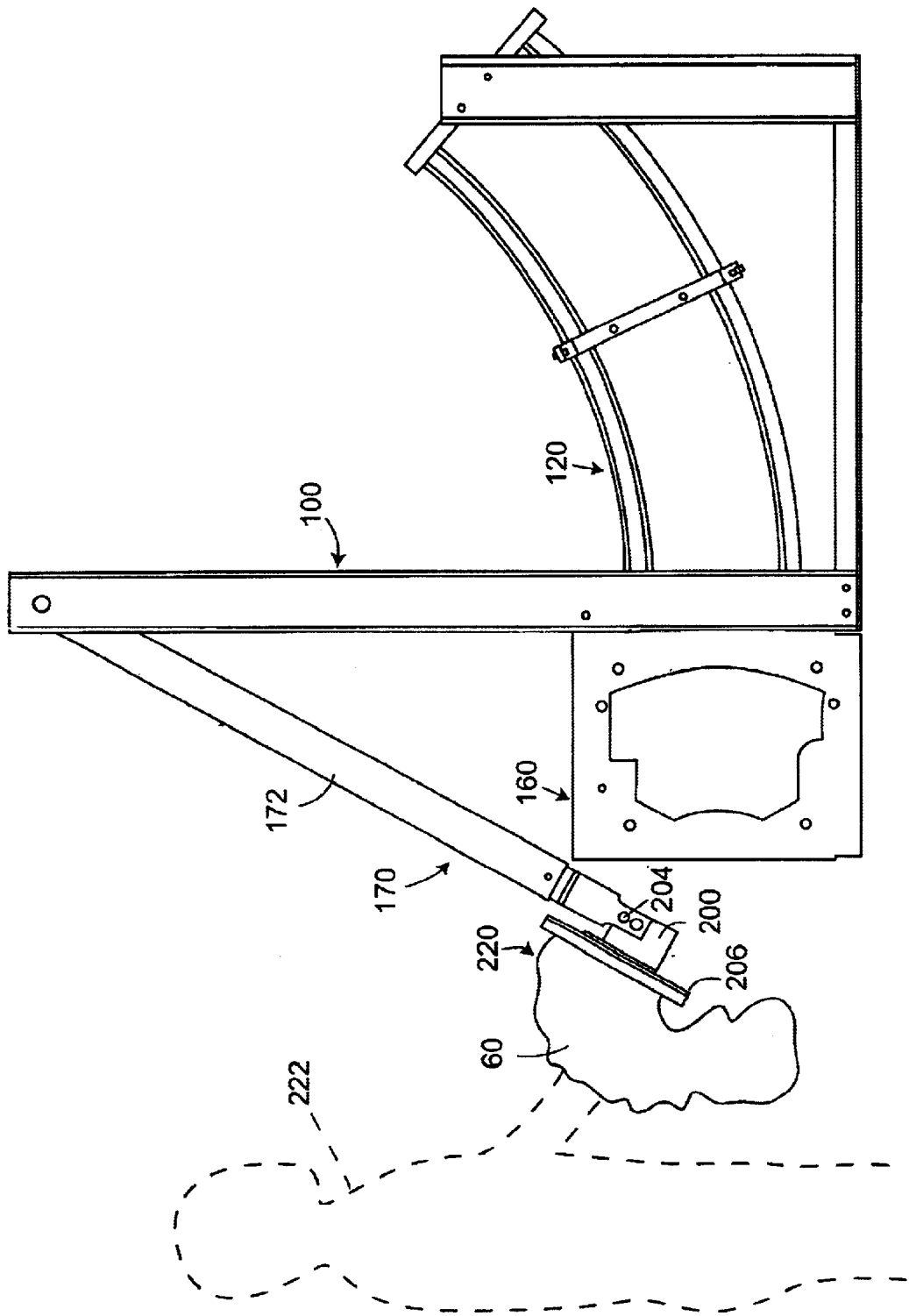
FIG. 11 is a cross-sectional view showing a housing subassembly mounted to a component of the folding apparatus.

Reference is made to FIG. 11, which illustrates one of the initial steps of utilizing the folding apparatus 10. In FIG. 11, the arm assembly 170 has been rotated by some means through the channel 126 in the tube 120 and through the cutout 158 in the rear cover attachment 150 and is positioned conveniently relative to an operator shown in phantom line and by numeral 222. As can be appreciated, the front cover support member 160 has been moved aside (such as being rotated on its hinges). With the ram arm assembly 170 as illustrated, the housing subassembly 220 is mounted to the plate 206 and secured thereto. As previously mentioned, the housing subassembly comprises the housing, the retaining ring and the air bag with the neck of the air bag sandwiched between the retaining ring and the housing and the mounting studs of the retaining ring extending through the openings in the housing. The operator manipulates the housing subassembly 220 such that the fasteners 54 extend through opening 208 in plate 206. The housing subassembly can be secured to the plate 206 by fasteners such as bolts or, alternatively, the plate 206 can be magnetized by an electromagnet, permanent magnet, or a gripping apparatus to hold the housing 40 thereto. As can be seen in FIG. 11, the air bag 60 can be permitted to droop downwardly from the housing 40. Thereafter, the ram arm 172 is rotated rearwardly to the position as illustrated in FIG. 12.

Figure 12:
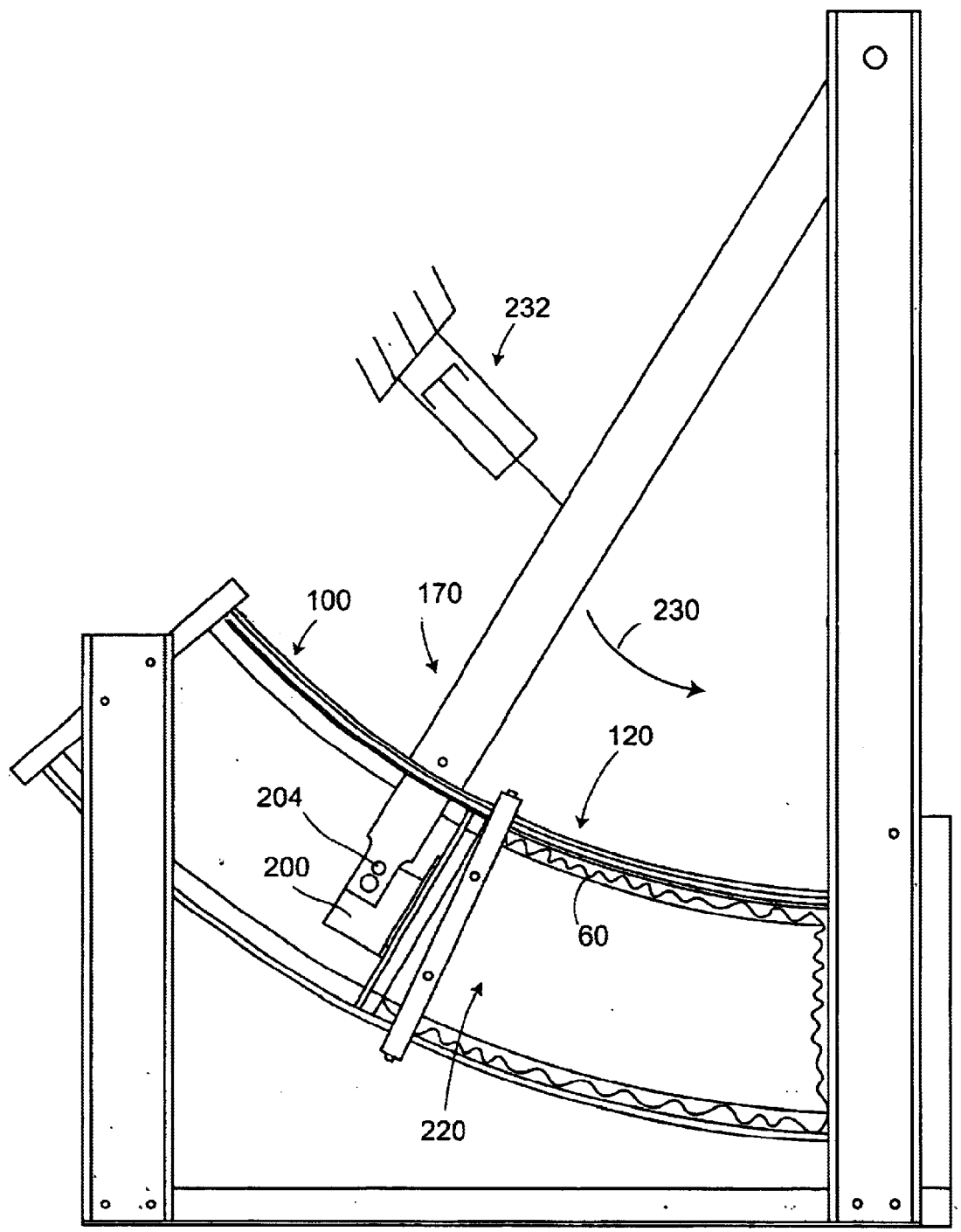
FIG. 12 shows another step in the operation of the folding apparatus.

In FIG. 12, the arm 172 and plate 206 have dragged the housing subassembly 220 and in particular the air bag 60 (and housing) up through the interior of the tube 120. As the housing 40 is moved up the tube, the normal friction between the air bag and the interior of the tube 120 will extend the air bag in the tube. Thereafter, the operator positions the cover 20 into the contour 156 of the rear cover support member 150 and subsequently closes the front cover support member 160 to hold the cover in place between members 160 and 150.

Thereafter, the ram arm 172 is forcefully rotated downwardly forcing the housing down the tube. Arrow 230 shows the direction of movement of the ram arm 172. The ram arm assembly can also include the means by which the arm is forcibly moved. The means can include for example a pneumatic cylinder 232 controllably moveable in and out of its housing (the arm can be manually moved as well). As the housing is moved it pushes and gathers the extended air bag 60, which is also pushed toward the cover 30 located at the mouth 144 of the tube (between members 150 and 160). The action of the arm 172 moves the housing 40 into the interior cavity 34 of the cover 30 and while doing so compresses the air bag 60 into the interior cavity (volume) 34 of the cover 30. If the cover and the housing are so designed to include snap-fit connections, typically comprising bendable-over features in the housing 40 and flexible arms on the cover 30, these features will snap together as the housing and cover are locked together.

Figure 13:
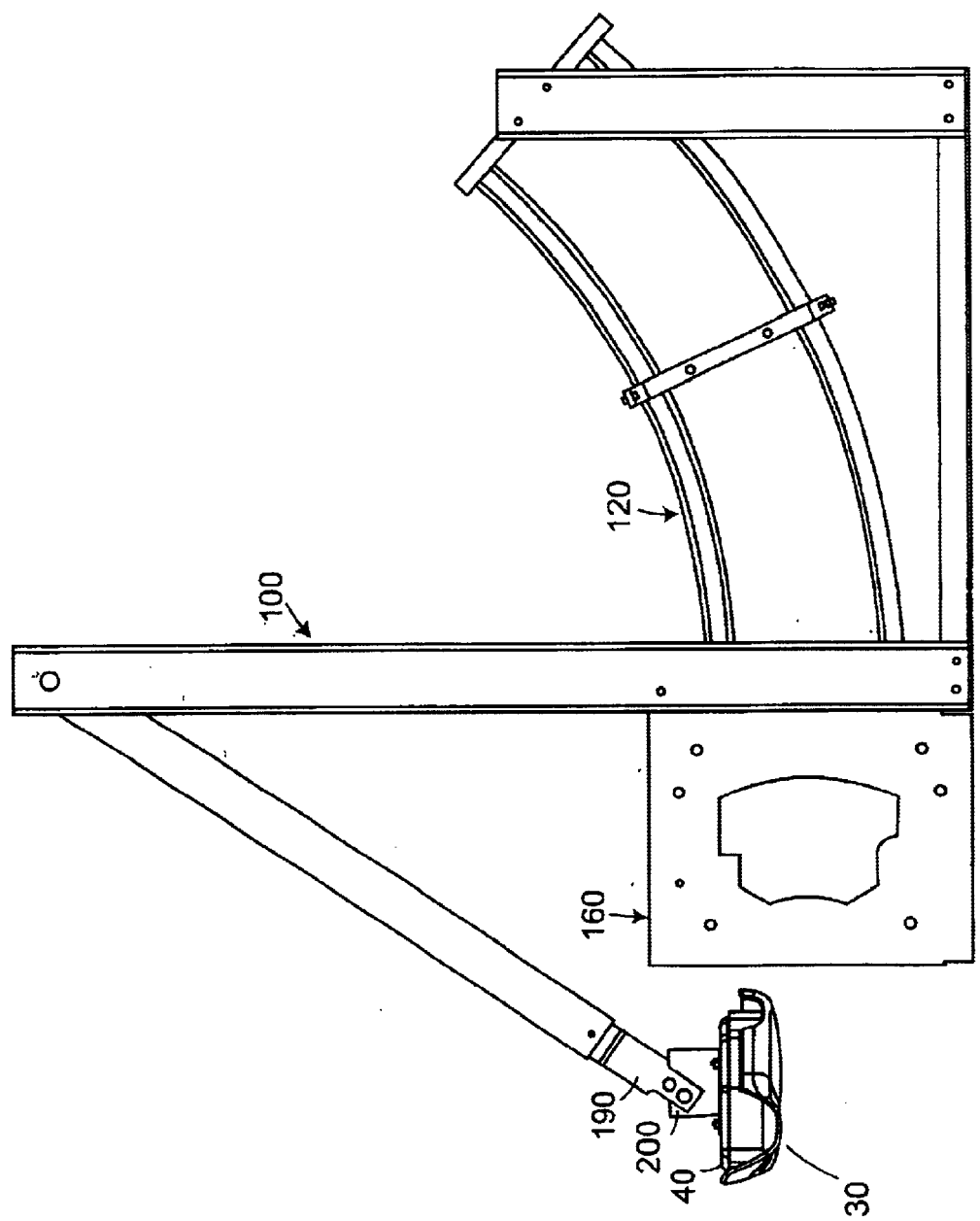
FIG. 13 illustrates another step in the use of the folding apparatus.

At the completion of this step of utilizing the folding apparatus 100, the cover 30 and housing subassembly 220 are in essence positioned at or within the cover support members 150 and 160. Thereafter, the operator moves the outer cover support member 160 out of the way such as by rotating it on its hinges and thereafter moves or causes the ram arm 172 to rotate out of the tube 120, as shown in FIG. 13.

When the arm 172 is initially rotated out of the tube after the above folding processes, the cover and housing subassembly will be together and essentially be in line with arm 172. If the ram arm assembly 170 includes a lock pin 204a, the pin 204a is removed, thereby permitting the housing support 200 (and cover and housing subassembly) to be rotated about pivot pin 204 to a horizontal orientation with the housing 40 facing upwards and the exposed face (top of the cover) of the cover 30 downwards. With the cover 30 in the illustrated position, the cover is removed from the housing support 200 and moved to a workstation with the cover maintained in this orientation. The cover 30 (with the air bag and housing therein) is placed in this upside-down orientation upon a work surface and the inflator 70 is inserted within opening 48 of the housing 40 during which the mounting studs 54 enter through a corresponding opening 76 in the flange 72 of the inflator. Thereafter, the inflator can be secured to the remaining part or parts of the module 20 by appropriate fasteners 77 (see FIG. 1).

Figure 14:
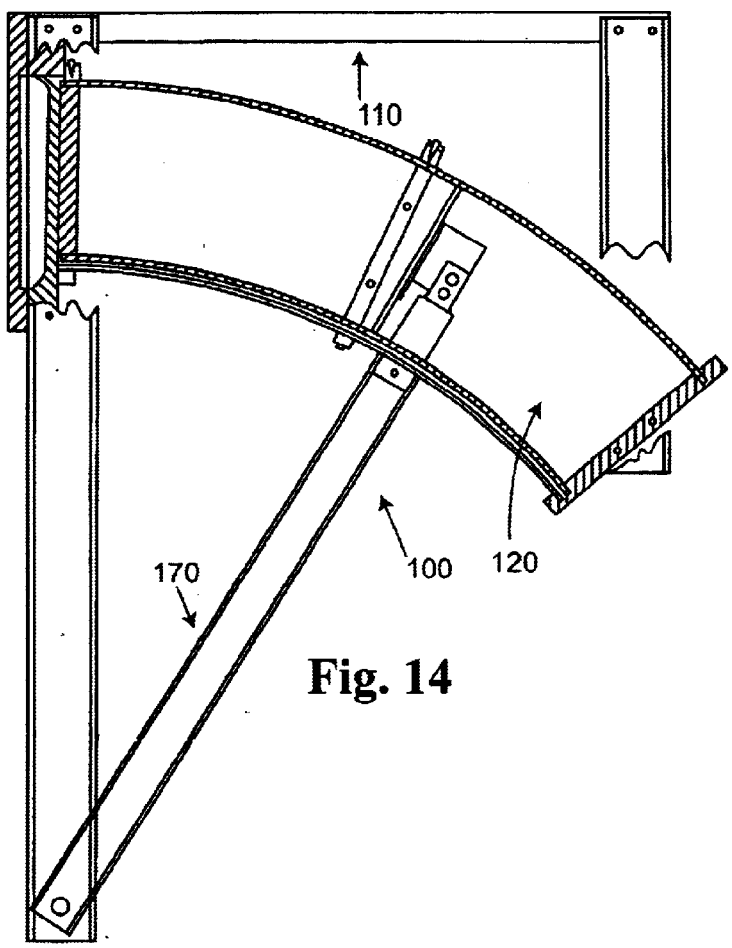
FIG. 14 is a cross-sectional view of an alternative embodiment of the invention.
Figure 15:
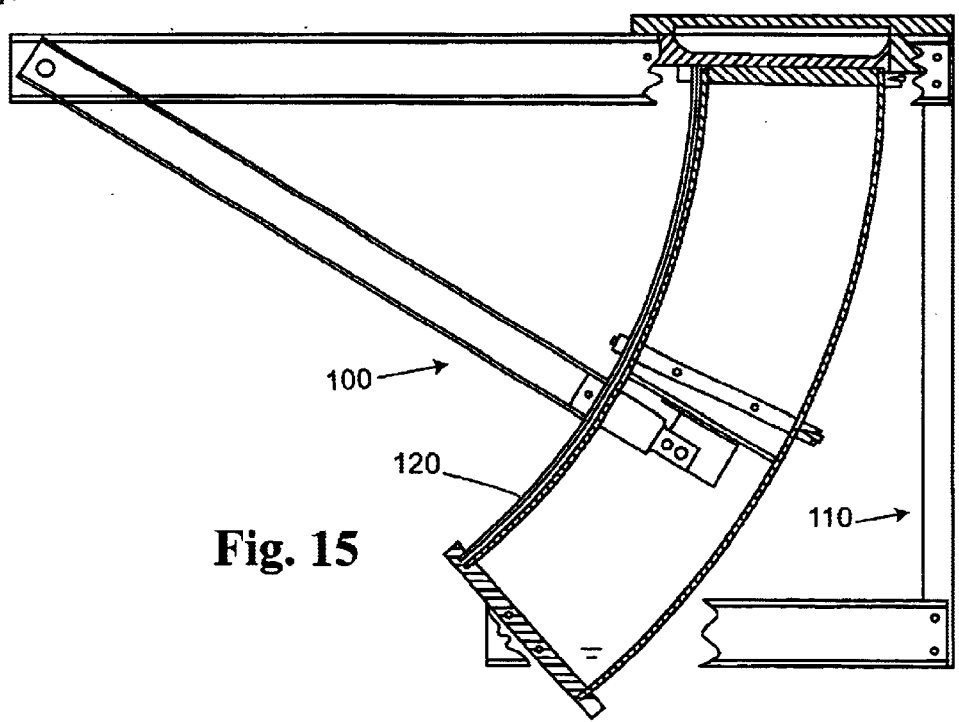
FIG. 15 is a top view of a further alternative of the invention.

Reference is briefly made to FIGS. 14–15. The apparatus 100 of FIG. 14 is substantially identical to that shown in FIGS. 3 and 4 with the exception that the apparatus has been rotated so that the tube 120 turns downwardly. The apparatus has been rotated to an orientation where the outer cover support member is at an angle off from vertical to show the versatility of the invention. The orientation may be more efficient for some users of the invention. As can be appreciated, the basic configuration of the invention can be repositioned at many different orientations. For example, FIG. 15 shows the apparatus aligned horizontally; the curvature of the tube can extend to the right or the left. In these embodiments the hinges for support member 160 can, if needed, can be repositioned so that the support member can swing in a desired direction to facilitate movement of the parts into and out from the tube.

Many changes and modifications in the above-described embodiment of the invention can, of course, be carried out without departing from the scope thereof. Accordingly, that scope is intended to be limited only by the scope of the appended claims.

What is claimed is:

1. A folding apparatus (100) for inserting an air bag and housing into an interior cavity of a cover, the apparatus comprising:

an arcuately shaped tube, the tube sized to slidably receive the housing and permit the air bag to be drawn up into the tube, the tube including an open first end oriented so that a plane through the first end is at a desired orientation;

a ram means movable through the tube for holding and moving the housing and air bag through the tube;

a holding means for orienting the cover so that its internal cavity is in alignment with and adjacent to the first end such that the housing and air bag can be rammed into the cover cavity; and wherein the ram means includes first means for rotating the cover, housing and air bag and wherein the first means includes a support portion for holding the housing, the first means as rotatable to a preferred orientation to enable the user of the apparatus to orient the cover, housing and air bag to this preferred orientation to facilitate dismounting the housing, cover and air bag as a unit and the subsequent assembly an air bag module.

2. The apparatus as defined in claim 1 wherein that portion of the ram means that holds the housing is movable along a radial direction.

3. The apparatus as defined in claim 1 wherein the ram means is movable through and out of the tube to a position convenient for the user of the apparatus to install and dismount the housing and air bag onto and off from the ram means.

4. The apparatus as defined in claim 1 wherein the air bag is rammed directly into the cover.

5. The apparatus as defined in claim 1 wherein the first means includes a pivot about which the support portion can rotate.

6. The apparatus as defined in claim 1 wherein the first means includes a lock means for locking and unlocking the support portion from other portions of the first means.

7. The apparatus (100) as defined in claim 1 wherein a wall of the tube includes a slot or channel, and wherein the ram means is movable through the channel.

8. The apparatus as defined in claim 1 wherein the tube is of a hollow, circular-sector shape.

9. The apparatus as defined in claim 1 wherein the ram means includes a ram arm pivotally mounted on one end thereof and a ram element operatively linked to the ram mounting member.

10. The apparatus as defined in claim 1 wherein the holding means includes a clam-shell mechanism for sandwiching the cover, in a preferred orientation, therebetween.

11. The apparatus as defined in claim 10 wherein the clam-shell mechanism includes a first cover support member secured proximate the first end of the tube.

12. The apparatus as defined in claim 11 wherein the clam-shell member further includes a second cover support member movable relative to the first cover support member.

13. The apparatus as defined in claim 1 wherein the desired orientation is substantially vertical.

14. The apparatus as defined in claim 1 wherein the cover and air bag housing are adapted to snap together upon insertion of the housing into the cover.

15. The apparatus as defined in claim 1 wherein the cover and air bag housing are adapted to be riveted together.

16. The apparatus as defined in claim 1 wherein the air bag is adapted to be stretched out by interference with interior surfaces of the tube as the housing is moved up the tube.

17. The apparatus as defined in claim 1 further including a barrier means for restricting contaminates from entering into the tube.

18. The apparatus as defined in claim 1 wherein the ram means includes force means for forcibly moving the housing and air bag compressively toward the cover.

19. The apparatus as defined in claim 1 wherein a plane through a centerline of the tube is generally vertically oriented.

20. The apparatus as defined in claim 1 wherein the tube curves one of upwardly and downwardly.

21. The apparatus as defined in claim 1 wherein the tube curves in a horizontal plane.

22. A folding apparatus (100) for inserting an air bag and housing into an interior cavity of a cover, the apparatus comprising:

an arcuately shaped tube, the tube being configured to slidably receive the housing and permit the air bag to be drawn up into the tube, the tube including an open first end oriented so that a plane through the first end is at a desired orientation, said tube defining a guiding slot;

a ram element movable through the tube for holding and moving the housing and air bag through the tube, the ram means includes a ram arm pivotally mounted on one end thereof and a ram element operatively linked to the ram mounting member;

a holding means for orienting the cover so that its internal cavity is in alignment with and adjacent to the first end such that the housing and air bag can be rammed into the cover cavity;

wherein the ram element is pivotably movable from a first position relative to the ram member, to a second position in which the ram element is substantially horizontal and such that if the cover were attached to the ram element the cover would lie substantially horizontal at the second orientation; and wherein the ram element is partially disposed within the slot.

\* \* \* \* \*